Oct. 27, 1964
L. M. McKAY
3,154,079
CANNULA FOR HEART AND VASCULAR SURGERY
Filed Feb. 23, 1962
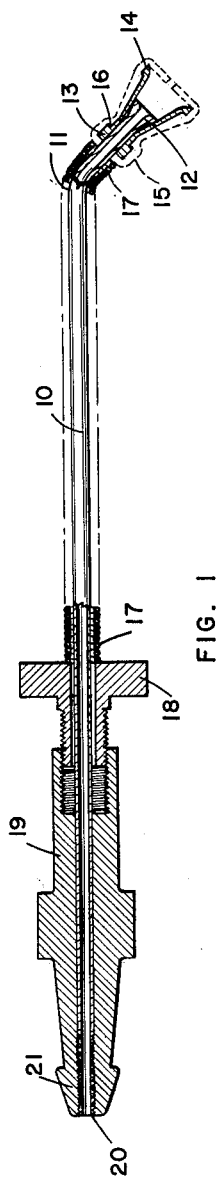
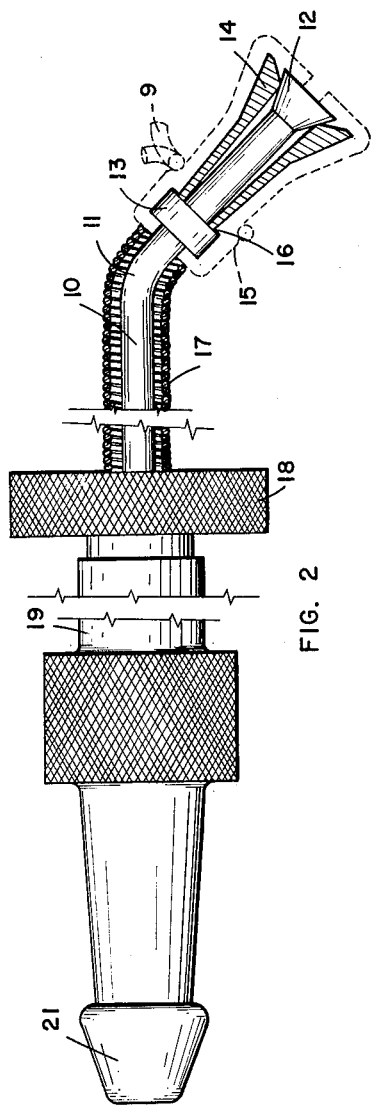
INVENTOR
LESTER M. MC KAY
BY: *Harold Shaw*
THEIR ATTORNEY

United States Patent Office 3,154,079
Patented Oct. 27, 1964

3,154,079
CANNULA FOR HEART AND VASCULAR
SURGERY
Lester M. McKay, San Francisco, Calif.
(362 Roberts St., Reno, Nev.)
Filed Feb. 23, 1962, Ser. No. 175,886
3 Claims. (Cl. 128—348)

This invention relates to apparatus for establishing a non-leaking cannulation. More particularly it relates to a device for cannulation during heart and vascular surgery.

In heart and vascular surgery there are circumstances where it is necessary to provide blood or other fluid into an open or exposed vessel during the operation. One such situation exists, for example, in open heart surgery. The present invention therefore provides a cannula which can be rapidly introduced, will remain in place by itself and will not leak.

These advantages are accomplished by a novel cannula having an expansible tip member which is easily adjusted to expand and thereby provide a liquid-tight connection. The tip is expanded when it is moved and spread by an inclined surface having a cam angle, the tip and the cam angle being engageably mounted so that the tip cannot be moved forwardly off of the main body for the cannula. The expansible tip is moved forwardly by any biasing means which in turn is moved by a suitable actuating means.

In the description that follows various embodiments of the novel cannula are described in more detail.

FIGURE 1 shows a cross-section of a representative cannula of this invention when it is in the open position.

FIGURE 2 is an enlarged drawing of the same cannula when it is in the closed position and shows an alternative form of the expansible tip member.

Referring to FIGURE 1, an elongated tube member 10 has a curved section 11 and an inclined cam surface 12 at one end. An expansible tip member 13, having flexible leafs 14 laterally disposed, is located adjacent to the inclined cam surface 12. The flexible leafs 14 of the tip member 13 will expand radially when the tip member 13 is moved over the inclined cam surafce 12. The inside diameter of the expansible tip member 13 is less than the maximum outside diameter of the inclined cam surface 12 so that the tip member 13 is engaged and cannot be lost during the surgery.

When in actual use, the expansible tip 13 is covered by a sleeve of rubber tubing 15, shown by the dotted line, which may be secured to the tip member 13 by a suture 9 (in FIGURE 2) at the shoulder 16. Adjacent to the expansible member 13 is a biasing means 17 and in the drawings the biasing means is shown as a coil of wire disposed on the elongated tube 10. The biasing means 17 is particularly suitable when a coil of wire is used as it permits easy movement over the curved section 11 in the elongated tube 10.

The biasing means 17 is moved forward by any suitable actuating means. In the drawings the actuating means is shown as an adjusting thumb nut 18. The actuating means 18 is rotatably mounted and is secured to the elongated tube 10. In FIGURE 1, the securing means is illustrated as a threaded luer 19 engaging threads 20 on the periphery of the elongated tube 10. The end 21 of the cannula, without regard for its structure, is adapted to receive and secure rubber, or similarly suitable tubing (not shown) which feeds to the open or exposed vessel previously mentioned. In the situation where heart surgery is in progress, the open vessel would be a heart-lung machine.

The flexible leafs 14 of the expansible tip member 13 may be of any suitable design and construction wherein there are a plurality of leafs 14. FIGURE 1 shows one suitable design for the expansible tip 13 when it is in the expanded or open position. FIGURE 2 shows another suitable design when the tip member is in the closed or compressed position. The sleeve of rubber tubing 15 has a sufficiently small inside diameter so that when it covers the expansible tip member 13 it will compress and collapse the flexible leafs 14 as shown in FIGURE 2. When in that position the actuating means 18 will not be exerting any force on the expansible tip member 13 via the biasing means 17.

When the cannula is inserted in, for example, a coronary ostium, the flexible leafs 14 are radially expanded (FIGURE 1) by causing the flexible tip member 13 to move over a portion of the inclined cam surface 12. The movement is accomplished by a few turns of the actuating means 18 which moves the biasing means 17 forward. The rubber sleeve, or cover 15, will then assume a conical shape of increasing diameter as it is expanded against the arterial wall. A fluid-tight seal is thereby formed. After the cannula is secured in the coronary ostium, it may be conveniently moved out of the operative field and placed along the laterial aortic wall by reason of the curved section 11. An advantage is thus achieved in that the cannula need not be held by a member of the operating team. Another advantage of the novel cannula is that it can be introduced in a matter of a minute or two. Yet another advantage is that it need not be removed until the closure is nearly completed so that perfusion is interrupted only briefly. To remove the cannula, the actuating means is rotated backwards whereupon the force exerted to hold the flexible leafs 14 expanded via the biasing means 17 is released. The force of the stretched rubber sleeve 15 will then collapse the radially expanded flexible leafs 14.

It will be readily seen that the present invention is capable of various modifications. In addition to modifications in the design and construction of the flexible leafs 14, the biasing means 17 may be, for example, a thin flexible rod. The actuating means may then take the form of a plunger having locking means to secure the plunger and the expansible tip member 13 in the open position. In any case, it is preferred that the several parts of the cannula be easily detached from the elongated tube 10 for cleaning and sterilization. Still other modifications may be adopted without departing from the spirit of the invention.

I claim as my invention:
1. A cannula suitable for heart and vascular surgery comprising, in combination,
    (a) an elongated tube member having a curved section and having disposed on the said member an inclined cam surface formed on one end of the said tube member,
    (b) an expansible tip member adjacent to the said end and operably engaging said cam surface,
    (c) actuating means, secured to said tube member, for moving said tip member in one direction to ex- pand said tip member and in the opposite direction to permit said tip member to retract,
(d) a biasing means between the said tip member and said actuating means whereby the movement of the actuating means is transmitted diagonally around the said curved section,
(e) the other end of the tube member being adapted to receive and secure flexible tubing.

2. The cannula of claim 1 in which the expansible tip member comprises a plurality of flexible leafs radially disposed.

3. The cannula of claim 1 in which the biasing means is a coil of wire wound around the said tube member.

References Cited in the file of this patent

UNITED STATES PATENTS

| | | |
|---|---|---|
| 2,790,442 | Donaldson | Apr. 30, 1957 |
| 2,905,178 | Hilzinger | Sept. 22, 1959 |
| 2,918,919 | Wallace | Dec. 29, 1959 |
| 3,008,467 | Morris | Nov. 14, 1961 |

FOREIGN PATENTS

| | | |
|---|---|---|
| 238,602 | Germany | Oct. 2, 1911 |